United States Patent [19]

Simonetti

[11] Patent Number: 4,616,775

[45] Date of Patent: Oct. 14, 1986

[54] TRANSLATABLE SOLDERING MACHINE

[75] Inventor: Jean-Pierre Simonetti, Gif-sur-Yvette, France

[73] Assignee: Outillages Scientifiques et de Laboratoires O.S.L. S.A., Carros, France

[21] Appl. No.: 798,170

[22] Filed: Nov. 14, 1985

[30] Foreign Application Priority Data

Nov. 15, 1984 [FR] France .............................. 84 17451

[51] Int. Cl.⁴ ........................... B23K 3/00; B23K 3/06
[52] U.S. Cl. ...................................... 228/37; 228/56.1
[58] Field of Search ................... 228/56.1, 37, 180.1, 228/260

[56] References Cited

U.S. PATENT DOCUMENTS 3,386,166  6/1968  Tardoskegyi .......................... 228/37
4,512,508  4/1985  Pachschwöll .......................... 228/37

FOREIGN PATENT DOCUMENTS 0118091   2/1984  European Pat. Off. ............. 228/37
8204971   3/1982  France .................................. 228/37
209471   12/1983  Japan ................................. 228/56.1
76660     5/1984  Japan .................................. 228/37

Primary Examiner—Nicholas P. Godici
Assistant Examiner—Samuel M. Heinrich
Attorney, Agent, or Firm—Wood, Herron & Evans

[57] ABSTRACT

Wave soldering machine of the type comprising a frame, at least one solder pot mounted on the frame and equipped with a nozzle designed to produce a wave of solder, a conveyor mounted on the frame and designed to carry the printed circuit boards along a substantially linear path, and a device for adjusting the height of the solder pot, thus permitting the adjustment of the height of the wave with respect to the path, machine wherein the frame comprises a moving track of general direction similar to that of the conveyor and on which is mounted the solder pot, the path and track forming together a predetermined angle of small value, and the track having an inclination as small as possible with respect to the horizontal, and a device for adjusting the position of the solder pot along the moving track.

17 Claims, 4 Drawing Figures

TRANSLATABLE SOLDERING MACHINE

The present invention relates to a wave soldering machine for soldering electronic components mounted on printed circuit boards.

In machines of this type, the boards are carried on a conveyor moving horizontally or in slightly upwardly or downwardly inclined direction and come in tangential contact during their displacement with the top of a wave of molten soldering alloy created by a nozzle.

It is important, in order to have a good quality solder, to obtain an extremely accurate relative positioning, in a vertical direction, of the wave of solder and of the boards being carried on the conveyor. For example, it has been found that said positioning should be accurate to a fraction of a millimeter.

To achieve this, it is customary to mount the assembly constituted by the solder pot topped with the nozzle, on supports which are vertically adjustable and which are used to adjust both the horizontal position of the nozzle and its height.

Insofar as the weight of said solder pot/nozzle assembly can often reach several hundred kilos, the adjustable supports unquestionably need to be dimensioned accordingly and as a result they do not offer the flexibility and the accuracy of adjustment which is really required.

Also, once the solder pot has been taken out for maintenance purposes, adjustments have to be made before the machine can be operative again.

And if for some reason, the inclination of the conveyor has to be altered, then the height of the solder pot also requires adjustments.

One disadvantage with this particular design is that it is difficult to fit it with motor means in order to automate or semi-automate said adjustments. Indeed, it would be necessary to equip said adjustable supports with high-powered motors, hence expensive ones, without really gaining on flexibility or accuracy of adjustment.

Yet it is on the other hand impossible to do without adjustments because manufacture and assembly limits for the different components, introduce, in any new machines, some very important variations in the vertical direction between the solder pot and the conveyor.

Finally, these machines are also equipped with a fluxing device and with a pre-heating device, both of which also require accurate vertical adjustments with respect to the boards carried by the conveyor.

Although such devices are considerably lighter than the solder pot, their adjustment in height raises a number of problems:

the presence of more or less viscous splashings around the fluxing device, a high temperature (around 400° C.) near the preheating device.

It is the object of the present invention to overcome the aforesaid disadvantages by proposing a wave soldering machine comprising a frame, at least one solder pot mounted on said frame and equipped with a nozzle designed to produce a wave of solder, a conveyor mounted on said frame and designed to carry the printed circuit boards along a substantially linear path, and a device for adjusting the height of said solder pot, thus permitting the adjustment of the height of the wave with respect to said path, wherein said frame comprises a moving track of general direction similar to that of the conveyor and on which is mounted the solder pot, said path and track forming together a predetermined angle of small value, and said track having an inclination as small as possible with respect to the horizontal, and a device for adjusting the position of the solder pot along said moving track.

The invention will be more readily understood on reading the following description with reference to the accompanying drawings in which.

Figure 1:
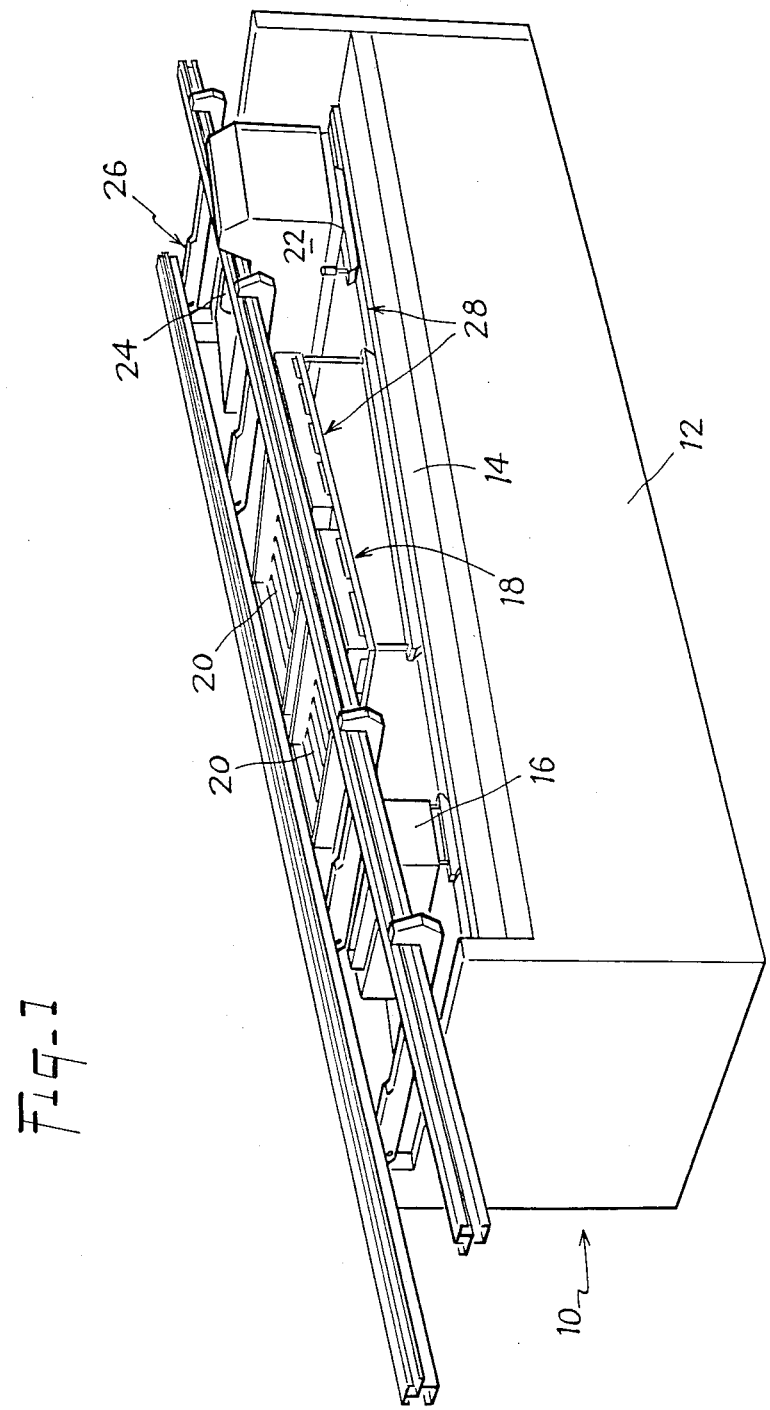
FIG. 1 is a perspective view of the machine assembly according to the invention.

The soldering machine 10 illustrated in FIG. 1 comprises an elongated frame 12, on the top face of which is fixed a sheetplate 14 defining a mounting plane.

On said mounting plane, are successively mounted, from left to right when viewing the figure:

a fluxing device 16, designed to produce a wave of foam of fluxing product at its upper part, a preheating device 18, constituted by radiant panels 20 and designed to heat the printed circuit boards by infrared radiations, a solder pot 22, designed to produce at its upper part a wave of liquid solder alloy through a nozzle 24.

The machine further comprises a conveyor 26, mounted over the aforesaid devices and designed to carry the printed circuit boards (not shown) laid flat thereon, along a horizontal or slightly upwardly or downwardly inclined rectilinear path.

Each printed circuit board is laid on the conveyor so that its face intended to receive the solder is turned downwards, and the path followed by the boards on the conveyor ensures that the lower faces of said boards pass successively over the fluxing device, the preheating device and then the solder pot, so that said lower faces are licked by the wave of solder created by the nozzle of the solder pot.

Figure 2:
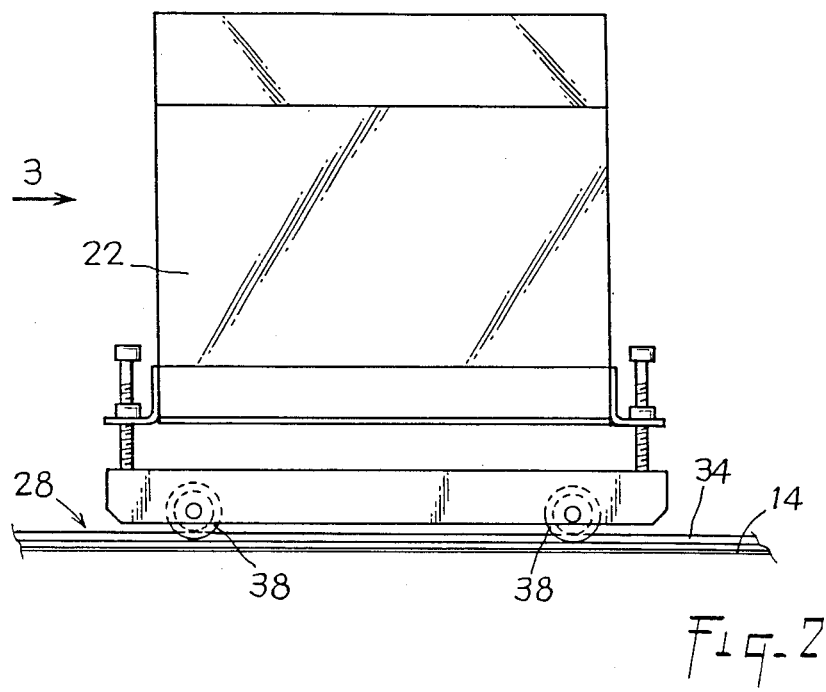
FIG. 2 is a detailed side view of the machine shown in FIG. 1, taken on the level of the solder pot.

The frame 12 comprises a moving track 28, which is more precisely formed on the mounting plane 14 as follows (FIGS. 2 to 4):

The moving track is defined by two parallel rolling paths 30 and 32, the first one consisting in a flat surface 34 and the second one consisting in a rail 36, the solder pot being mounted on the rolling path via rolling members 38, placed approximately at the four corners of the base of the solder pot.

The rail 36 is shaped as a triangular section obtained by bending (in 40) the sheetplate 14. Besides supporting the solder pot the object of rail 36 is to guide said solder pot in its displacement.

In the illustrated example, the conveyor 26 is slightly inclined upwardly and the mounting plane 14,—hence the moving track 28—is horizontal. Thus, when the solder pot is moved along said moving track, the vertical relative distance between the nozzle of the solder pot and the conveyor varies, and this variation may be controlled with great accuracy, despite the heavy weight of the solder pot, since the force needed for moving said pot along the moving track is very small.

It should be noted at this stage that what is really important is not so much the horizontality of the moving track, which can be slightly inclined with respect to the horizontal, it is the fact that the rolling path and the conveyor must form together an angle of small value, preferably less than 10 degrees in order to obtain the wanted accuracy of adjustment. Provision should of course be made for the rolling track to form as small an angle as possible with the horizontal so that the force required for moving the solder pot remains small in comparison to its weight.

The advantage of using a rail as one of the rolling tracks is that it eliminates the need to adjust the distance between rolling members 38 and/or rolling tracks 30,32.

The fact that the rail 36 is obtained by bending the sheetplate 14 has the advantage of stiffening the latter, so that the structure of the frame can be simplified, with the added advantage of procuring a rolling and guiding track extending over the entire length of the machine.

Instead of the rolling tracks 30, 32, the solder pot can also be mounted on its moving path via slide guides, preferably lined with a material having a low friction coefficient, such as for example PTFE (polytetrafluoroethylene). According to another variant, the rolling members are produced in the form of ball bearing cages and/or pads.

Figure 3:
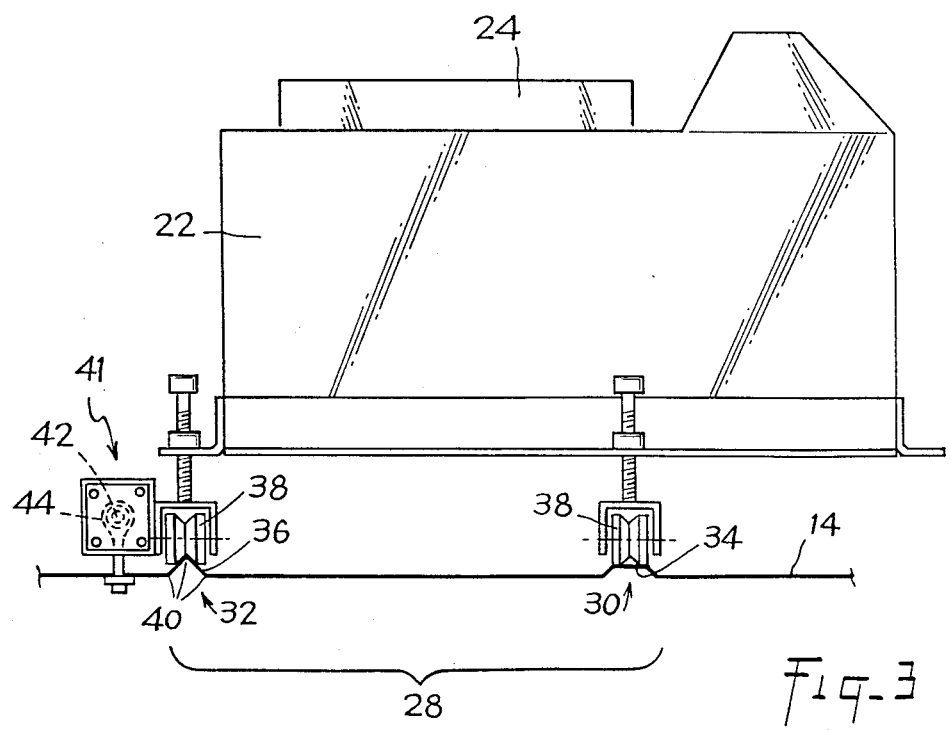
FIG. 3 is a view of the solder pot taken along arrow 3 of FIG. 2.
Figure 4:
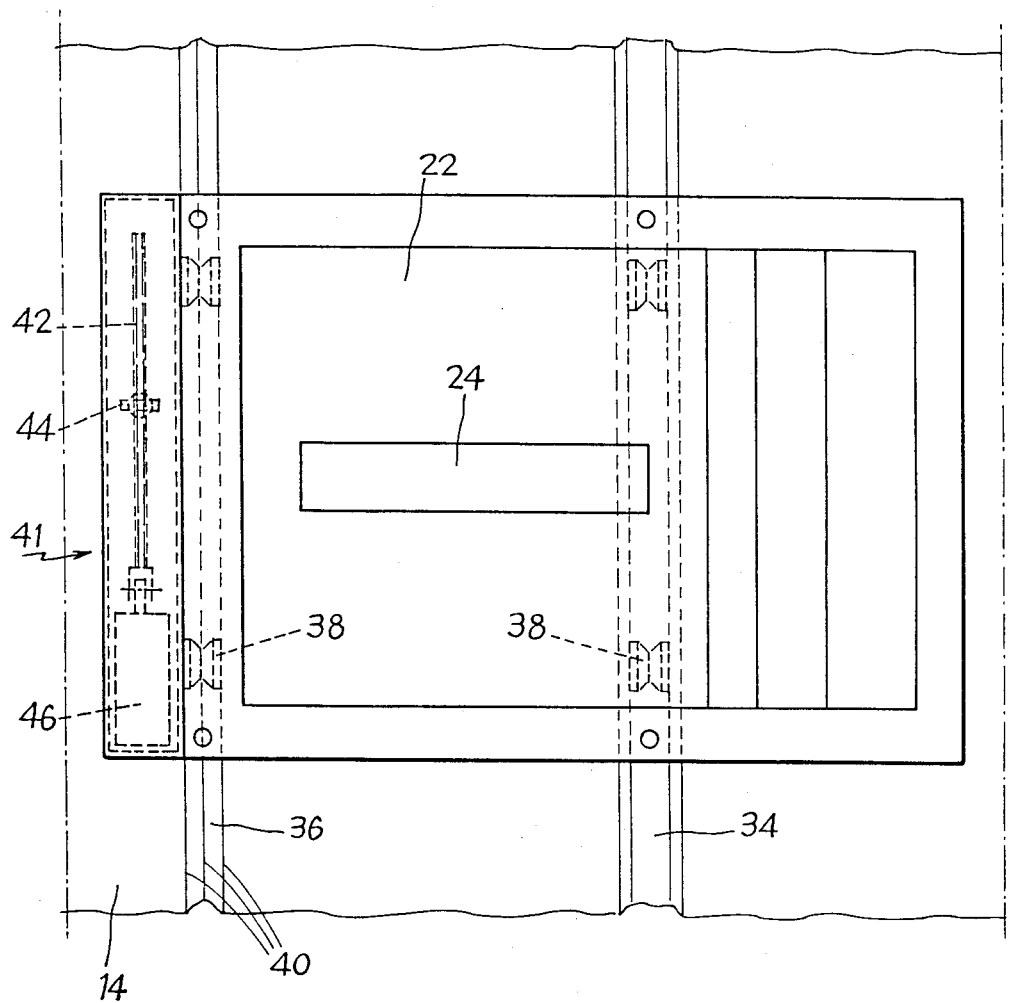
FIG. 4 is a plan view of the solder pot shown in FIGS. 2 and 3.

As illustrated in FIGS. 3 and 4, the machine comprises a device 41 for adjusting the position of the solder pot along its moving track.

Said device, of the type conventionally known as screw-and-nut, comprises a screw 42 rotatably mounted on the solder pot but without the possibility of moving longitudinally with respect to said pot, and a nut 44 fixedly mounted on said sheetplate 14, preferably inside a swivel case or via a universal joint in order to permit mutual alignment of the screw and the nut. Rotation of the screw causes its displacement with respect to the nut, hence the displacement of the solder pot with respect to its moving track.

The demultiplication created by the screw and nut combination enables a very accurate adjustment of the position of the solder pot. It also faciliates motorizing the adjustment device by means of a low power motor 46, of which the shaft is coupled directly to the screw 42.

Another advantage resides in the non-reversibility of this adjusting device which gives reliable brake and stopping means for the solder pot.

Obviously, the mounting of the screw 42 and of the nut 44 may be reversed, the screw 42 being mounted on the frame and the nut 44 on the solder pot.

Finally, according to an advantageous embodiment of the invention, the fluxing device and/or the preheating device are also mounted on the moving track 28.

Their position is adjustable vertically with respect to the conveyor in a way which is as simple as that used for adjusting the position of the solder pot.

What is claimed is:

1. Wave soldering apparatus of the type comprising a frame, at least one solder pot mounted on said frame and equipped with a nozzle designed to produce a wave of solder, a conveyor mounted on said frame and adapted to carry printed circuit boards along a substantially linear path into operative relationship with said wave of solder for soldering, and means for adjusting the height of said solder pot with respect to said path, thus permitting adjustment of the height of the nozzle with respect to said path, wherein said frame comprises an elongated track extending in a direction similar to that of the conveyor and on which is mounted the solder pot, said path and track converging toward each other at a predetermined angle of small value, said track being substantially parallel with respect to the horizontal, and further including means for adjusting the position of the solder pot along said elongated track.

2. Apparatus as claimed in claim 1, wherein said angle is less than 10 degrees.

3. Apparatus as claimed in claim 1, wherein said solder pot is mounted on said track by way of roller members.

4. Apparatus as claimed in claim 1, wherein said solder pot is mounted on said track by way of slide guides.

5. Apparatus as claimed in claim 3, wherein said roller members comprise ball bearing cages and/or pads.

6. Apparatus as claimed in claim 3, wherein said elongated track comprises two parallel rolling tracks.

7. Apparatus as claimed in claim 6, wherein one of said rolling tracks comprises a rail.

8. Apparatus as claimed in claim 7, wherein the other rolling track comprises a flat surface.

9. Apparatus as claimed in claim 7, wherein the rail comprises an elongated rail of triangular cross section.

10. Apparatus as claimed in claim 9, wherein a sheetplate is provided at the top of the frame and said triangular cross section rail is defined by bends made in said sheetplate.

11. Apparatus as claimed in claim 1, wherein the adjusting means comprises a cooperating screw and nut oriented for movement in parallel to said track.

12. Apparatus as claimed in claim 11, wherein said screw is mounted on the solder pot and said nut is mounted on the frame.

13. Apparatus as claimed in claim 12, including a motor means for driving said screw.

14. Apparatus as claimed in claim 1, comprising a fluxing device, wherein said fluxing device is also mounted on said elongated track and further including means for adjusting the position of said fluxing device along the track.

15. Apparatus as claimed in claim 1, comprising a pre-heating device mounted on said track and further including means for adjusting the position of said pre-heating device along the track.

16. Apparatus as claimed in claim 11, wherein said screw is mounted on said frame and said nut is mounted on said solder pot.

17. Apparatus for soldering printed circuit boards and selected components thereon, said apparatus being of the type including a frame, a solder pot mounted on said frame and having a nozzle for generating a solder wave, a conveyor for conveying printed circuit boards in a path past said solder wave such that at least portions of said printed circuit board and any of said selected components are operably soldered together, and means for adjusting the position of said solder pot and said nozzle with respect to said path, said adjusting means including:
    elongated tracks on said frame;
    said path and said tracks converging toward each other at an included angle of substantially less than 90°; and
    said solder pot being selectively movable along said tracks for adjusting the disposition of said nozzle with respect to said path.

* * * * *